UNITED STATES PATENT OFFICE.

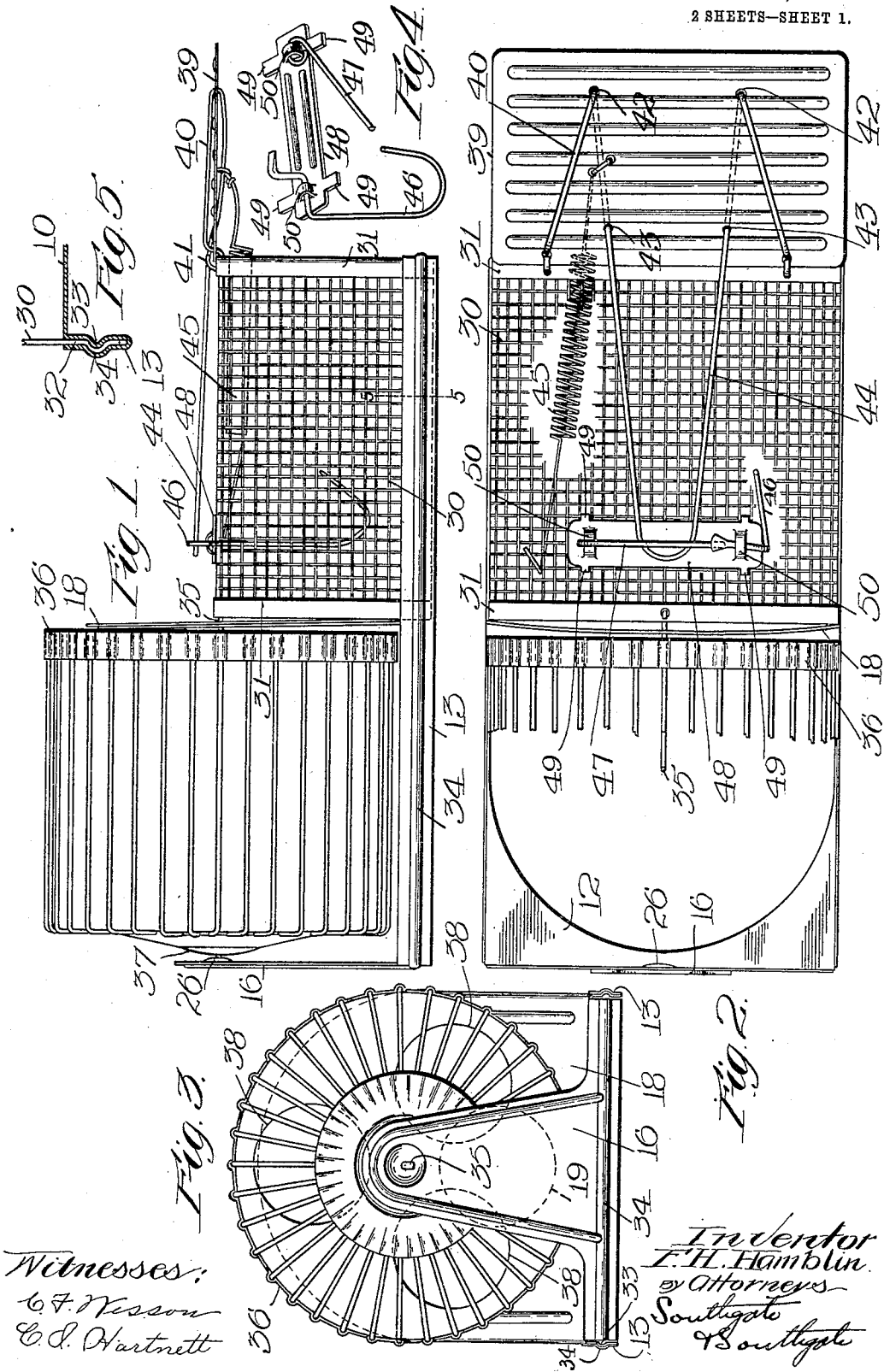

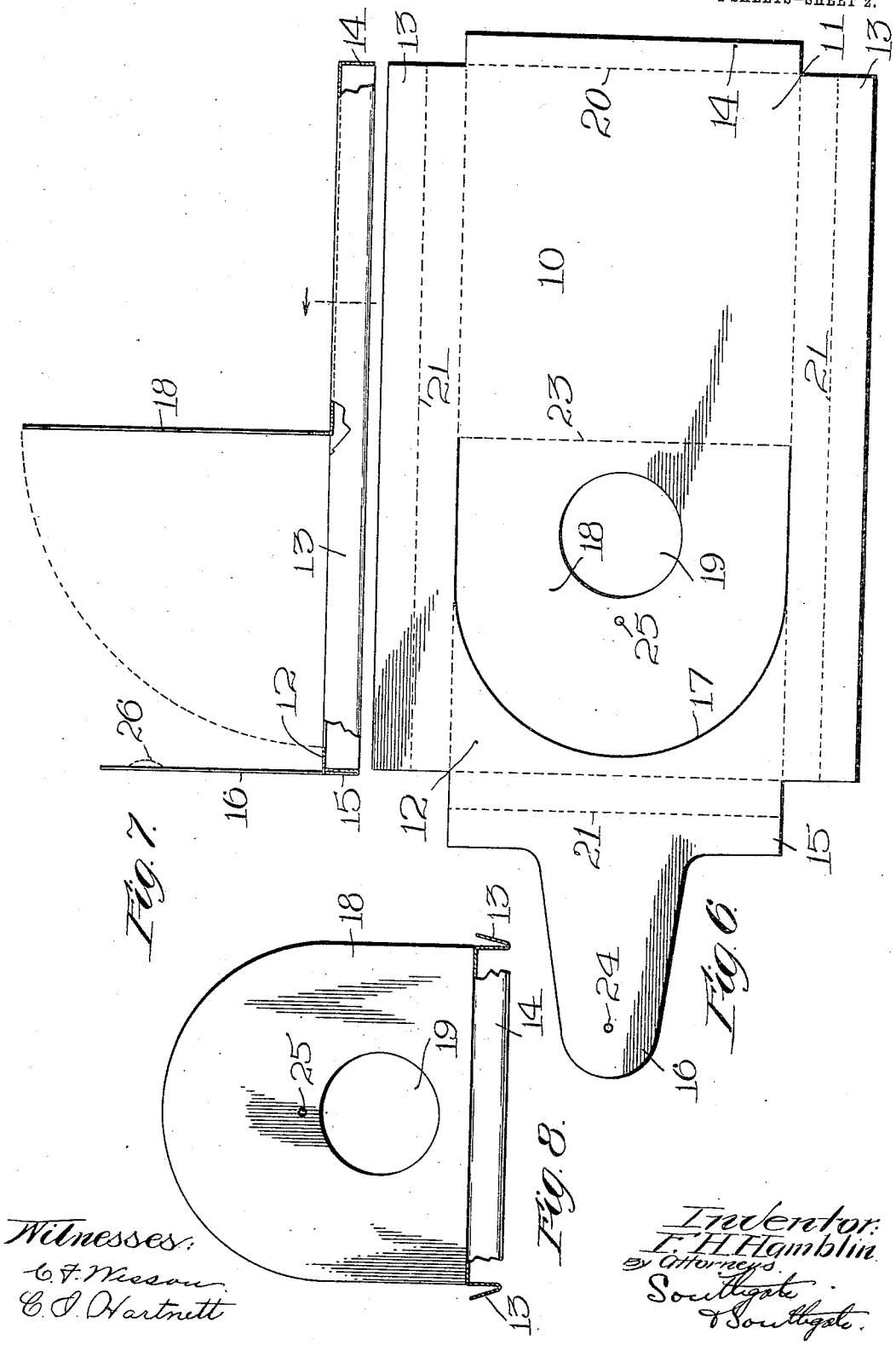

FRANK H. HAMBLIN, OF WORCESTER, MASSACHUSETTS.

TRAP.

935,974.  Specification of Letters Patent.  Patented Oct. 5, 1909.

Application filed November 14, 1908. Serial No. 462,706.

*To all whom it may concern:*

Be it known that I, FRANK H. HAMBLIN, a citizen of the United States, residing at Worcester, in the county of Worcester and State of Massachusetts, have invented a new and useful Trap, of which the following is a specification.

This invention relates to a trap or cage capable of being made in many sizes and forms, and for numerous purposes, but particularly applicable for use as a mouse trap.

The principal objects of the invention are to provide a substantially integral sheet metal construction for the main portions of the trap so that the wooden constructions now in use can be done away with and at the same time the cost of manufacture will be lessened and the neatness and value of the article increased, and to provide an improved means for holding the sides of the cage firmly in position on the bottom thereof, said means being integral with the bottom; also to provide an improved means for supporting a whirl, whereby the same will be accurately centered and easily rotated on a fixed axis; to provide an improved manner of hinging the door of the cage; to provide an improved means for holding the bait hook and connected parts so that they will not be likely to become disengaged from the cage in use.

Further objects and advantages of the invention will appear hereinafter.

Reference is to be had to the accompanying drawings, in which—

Figure 1 is a side view of a mouse trap constructed in accordance with this invention; Fig. 2 is a plan of the same partly broken away; Fig. 3 is an end view; Fig. 4 is a perspective view of the bait hook and connections; Fig. 5 is a sectional view on the line 5—5 of Fig. 1 on enlarged scale showing how the sides are held to the bottom; Fig. 6 is a plan of a flat blank for producing the bottom and platform and certain other features of the device; Fig. 7 is a side view of the same partly in section after the parts are struck up so as to bend them in a general way into their completed form before the other parts are connected therewith; and Fig. 8 is an end view of the same.

For the purpose of clearly showing how the device is made, the blank for the bottom and some other parts shown in Figs. 6, 7 and 8 will first be described. This blank 10 is preferably formed of thin sheet metal, as for example tin. It is originally died or cut out in flat form, as indicated in Fig. 6, and the main body 11 constituting the floor of the trap or cage is extended out to one end to form a horizontal platform 12. At the sides of these two parts two projecting flanges 13 are provided. On one side is a flange 14 of substantially half the width of each flange 13. On the other end is a flange 15 of the same width as the flange 13 having a central end projection 16. The part which has been called the platform is cut on a line 17 along three sides of the platform to form a member 18 connected with the platform along one side only and within it is cut out an opening 19. This completes the construction of the flat blank. Now in order to produce the floor, platform, and other connected parts of the cage, this blank is subjected to one or more bending operations. In the first place each of the flanges 13, 14 and 15 is bent downwardly from the floor or platform on the margins thereof represented by the dotted lines 20 in Fig. 6. Preferably by the same operation the flanges 13 and 15 are bent upwardly again on the dotted lines 21 so as to bring their outer edges nearly or quite into vertical position. By this construction it will be seen that a single downwardly extending flange 14 is provided at one end of the floor supporting it in a slightly elevated position, while double downwardly and upwardly extending flanges 13 and 15 are provided at the sides and at the other end. Moreover the projection 16 is now brought into vertical position. Either at the same or another operation the part 18 which is cut out along the line 17 is bent upwardly on a line 23 so as to form another vertical wall at the end of the floor 10. This leaves an open space in the platform 12. At the same time that some of the above operations are performed, the projection 16 and wall 18 are provided with perforations 24 and 25 respectively. The metal around the perforation 24 preferably is bent inwardly to form an inward projection 26. This constitutes the completion of this part of the device so far as it can be done before the parts are assembled. In order to employ this integral structure and assemble it with other elements to form the completed trap or cage, a piece of metal, preferably woven wire fabric 30 having its edges bound by a pair of sheet metal bindings 31 is employed for the top and sides. This is bent preferably by dies into proper form, and then the bottom edges 32 of its sides are put down into the space between the downwardly and upwardly extending flanges 13. These flanges are then provided with beads or grooves 33 and 34 respectively, and the woven wire fabric is correspondingly grooved by the same operation preferably by pressure in dies or rollers. This not only bends the upwardly extending flange 13 into substantial contact with the inner one, but it secures the edges of the foraminous metal fabric 30 securely in position without necessitating the use of solder or other fastening means. It will be understood, of course, that the ends of the bindings 31 are secured in the same way and at the same time without necessitating any additional operation. Preferably also the bead and groove are extended clear around the flanges 13 and 15 so as to strengthen the same and improve the appearance of the device. It will be seen that in this way the sides and top of the cage are held firmly in position, and not only that, but the sharp edges of the tin are as a general thing brought in out of the way where they cannot project.

The wall 18 is fixed to the fabric 30 by passing a rod 35 through the binding 31 of the fabric, and securing it thereto, and passing said rod through the opening 25, and also through the opening 24 in the projection 16, and fastening the end from the outside thereof. At the same time this is done, a rotary whirl 36 is mounted in position on this rod. This whirl is provided with a projection 37 opposite the projection 26 so that only small bearing surfaces will come together, whereby the friction of the whirl will be greatly reduced. The whirl as usual is provided with openings 38 registering with the opening 19 as the whirl rotates. On the opposite end of the cage a door 39 is pivoted. This door preferably is formed of sheet metal which may be corrugated, and in order to avoid the generally unsatisfactory hinge construction which has usually been employed, it is hinged and operated by a single integral piece of wire 40 connected up in the following way. The two ends of this wire are formed into rings 41 constituting hinges and passing through the binding 31, and the adjacent upper edge of the door. They are then brought through to the outside of the door and along the outer surface of the same; then passed through holes 42 therein, and brought back upwardly along the inner surface of the door and out through the holes 43 between the hinges on that edge of the door. All this being formed from an integral wire 40 it will be understood that the projecting lever 44 thereof constitutes means for opening the door against the action of the springs 45, and also means for setting the trap in combination with the bait hook 46. This bait hook as usual is adapted to be set by means of a movable rod 47 for holding the end of the lever 44.

In order to avoid the danger of the loosening of the bait hook and rod they are mounted on a sheet metal plate 48 which is secured to the foraminous top by means of integral projections 49 which are bent under around the wire of the fabric. The sheet metal piece is shown as provided with four parallel slits, two near each end cutting out between them a pair of transverse bands 50 which are bent upwardly so as to permit the bait hook 46 and end of the rod 47 to be pivotally mounted under them. With this construction these parts are not likely to get out of position, or work loose in use, and consequently the life of the trap is greatly prolonged. It will be seen therefore that most of the parts of the trap can be formed of a single piece of sheet metal, although that is not absolutely necessary, as the various parts can be formed separately and soldered or otherwise secured together as desired. Also the door and bait-hook connections are greatly strengthened and improved, and the woven wire sides are securely fixed in position without the necessity of using solder or other fastening means.

The invention is capable of other uses than the one indicated above, and the cage and whirl support can be manufactured separately if desired, and each one applied to other forms of traps and the like.

While I have illustrated and described a preferred embodiment of the invention, I do not wish to be limited to all the details thereof or to the combination of each one with the others, as many modifications may be made by any person skilled in the art without departing from the scope of the invention as expressed in the claims.

What I do claim is:—

1. In a trap, the combination of a cage having a top, a plate secured thereto and formed of a single piece of sheet metal, said plate having four parallel slits therein, two located near each end, the metal between each pair of slits being raised, a bait-hook pivotally mounted on the plate under one of said raised portions, and a bar for setting and holding the bait-hook pivotally mounted under the other.

2. In a trap, the combination of a cage having a top, a plate secured thereto and having four parallel slits therein, two located near each end, the metal between each pair of slits being raised, a bait-hook pivotally mounted on the plate under one of said raised portions, a bar for setting and holding the bait-hook pivotally mounted on the other, and means controlled by the bait hook and bar for closing the trap.

3. In a trap, the combination of a cage, a bait-hook, a bar for setting and holding the bait-hook, and means controlled by the bait-hook and bar for closing the trap, said means comprising a door, wire hinges for connecting said door with the cage, each of said hinges extending from the edge of the door inwardly toward the other edge and passing through the door, and the wire thereof, being continued out beyond the door on the side thereof on which the hinges are located and in position to be engaged and held by said bait-hook and rod.

4. The combination with a trap having an opening, of a door therefor, a projection extending from said door by which the door may be operated, and hinges for the door integral with said projection.

5. The combination with a trap having an opening, of a door therefor, a pair of wire hinges connecting one edge of the door with the corresponding side of the opening, the wire of said hinges extending through the door and extending along the door to a point near the other edge, then extending through the door again and back along the opposite side between the hinges to points adjacent to the hinges and finally extending through the door again and forming a lever for operating the door.

6. The combination with a trap having an opening, of a door therefor, a wire hinge for connecting one edge of the door with one side of the opening, the wire of said hinge extending through the door near that edge, then along the door and transversely across it to a point near the other edge, then extending back through the door and along the same to a point near the first named edge, and finally extending out through the door and projecting therefrom so as to constitute a means for manipulating the door on its hinge.

7. As an article of manufacture, a trap or cage comprising a bottom, downwardly projecting flanges, additional flanges projecting upwardly from the bottom of said flanges, said bottom having an integral member projecting upwardly from the end thereof and constituting the end of the trap or cage, sides and a top consisting of a piece of woven wire fabric having a sheet metal edge binding held between said downwardly and upwardly projecting flanges, means for connecting said end piece with the edge binding, and means coöperating with said connecting means for supporting a whirl.

8. As an article of manufacture, a trap or cage having a sheet metal bottom, a cage on said bottom, said bottom having a platform extending therefrom and integral therewith and provided with an opening therein, the sheet metal taken from said opening being bent upwardly from the edge of the bottom and constituting the end of said cage, an integral upwardly projecting member on the end of the platform, and means supported by the cage and by the said member for carrying a whirl.

9. In an article of the class described, the combination of a sheet metal platform having ends, and provided with an opening, the metal taken from said opening being bent upwardly near one end of the platform, the metal at the opposite end of the platform being bent back in an upward direction so as to provide an upward projection, a shaft fixed to said projection and to the upwardly extending portion of the platform, and a whirl carried by said shaft.

10. As an article of manufacture, a trap or cage comprising a bottom, downwardly projecting flanges, additional flanges projecting upwardly from the bottom of said flanges, said bottom having an integral member projecting upwardly from the end thereof and constituting the end of the trap or cage, sides and a top consisting of a piece of woven wire fabric having a sheet metal edge binding held between said downwardly and upwardly projecting flanges, and means for connecting said end piece with the edge binding at the top thereof.

11. A blank for a trap or cage base comprising a single integral piece of sheet metal having a main rectangular body provided with two side flanges and an end flange, the end flange being substantially half the width of the side flanges, whereby the flanges can be turned down at right angles to the body, and the side flanges can be doubled back to form three supports of equal height.

12. A blank for a trap or cage base comprising a single integral piece of sheet metal having a main rectangular body provided with two side flanges and an end flange, the end flange being substantially half the width of the side flanges, whereby the flanges can be turned down at right angles to the body, and the side flanges can be doubled back to form three supports of equal height, and having a member opposite said end flange adapted to be bent upwardly to form the end of the cage.

13. A blank for a trap or cage base comprising a single integral piece of sheet metal having a main rectangular body provided with two side flanges and a front end flange and having a member opposite the front end flange connected with the body along a line parallel with the end and severed from the body through the rest of its outline whereby it can be turned upwardly from the body at right-angles thereto, said body having a flange at the rear end behind said member adapted to be bent down to form a rear end support and then to be doubled over to extend upwardly along the end thereof, and having a projection extending beyond the upper end of said flange adapted to be left in vertical position when the flange is doubled over.

In testimony whereof I have hereunto set my hand, in the presence of two subscribing witnesses.

FRANK H. HAMBLIN.

Witnesses:
   ALBERT E. FAY,
   C. FORREST WESSON.